United States Patent
Yoshida et al.

(10) Patent No.: US 6,687,299 B2
(45) Date of Patent: *Feb. 3, 2004

(54) MOTION ESTIMATION METHOD AND APPARATUS FOR INTERRUPTING COMPUTATION WHICH IS DETERMINED NOT TO PROVIDE SOLUTION

(75) Inventors: Toyohiko Yoshida, Hyogo (JP); Kazuya Ishihara, Hyogo (JP); Yoshinori Matsuura, Hyogo (JP); Tetsuya Matsumura, Hyogo (JP); Vasily Moshnyaga, 304 Kaizer Bldg., 2-5-32, Umebayashi, Jonan-ku, Fukuoka-shi, Fukuoka 814-0144 (JP)

(73) Assignees: Renesas Technology Corp., Tokyo (JP); Vasily Moshnyaga, Fukuoka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,171

(22) Filed: Mar. 3, 1999

(65) Prior Publication Data

US 2003/0031257 A1 Feb. 13, 2003

(30) Foreign Application Priority Data

Sep. 29, 1998 (JP) .......................................... 10-275430

(51) Int. Cl.[7] .............................. H04B 1/66; H04N 7/12
(52) U.S. Cl. ................................. 375/240.16; 348/699
(58) Field of Search ................................ 348/143, 699, 348/402, 416, 407, 700, 416.1, 413.1, 407.1; 382/154, 236, 238; 395/800; 375/240, 122, 240.16, 240.15

(56) References Cited

U.S. PATENT DOCUMENTS

| | | | |
|---|---|---|---|
| 4,802,112 A | | 1/1989 | Yoshida et al. |
| 5,161,247 A | * | 11/1992 | Murakami et al. .......... 395/800 |
| 5,701,160 A | * | 12/1997 | Kimura et al. .............. 348/413 |
| 6,064,776 A | * | 5/2000 | Kikuchi et al. .............. 382/260 |
| 6,212,237 B1 | * | 4/2001 | Minami et al. .......... 375/240.16 |
| 6,215,899 B1 | * | 4/2001 | Morimura et al. .......... 382/154 |
| 6,269,121 B1 | * | 7/2001 | Kwak ..................... 375/240.16 |
| 6,269,174 B1 | * | 7/2001 | Koba et al. .................. 382/107 |

FOREIGN PATENT DOCUMENTS

JP 10-191352 7/1998

OTHER PUBLICATIONS

"VLSI Architectures for Video Compression–A Survey", by Peter Pirsch et al., Proc. IEEE, vol. 83, No. 2, Feb. 1995, pp. 220–246.

"ULSI Realization of MPEG2 Realtime Video Encoder and Decoder–An Overview", Masahiko Yoshimoto et al., IEICE Trans. Electron., vol. E78–C, No. 12, Dec. 1995, pp. 1668–1681.

(List continued on next page.)

*Primary Examiner*—Vu Le
*Assistant Examiner*—Behrooz Senfi
(74) *Attorney, Agent, or Firm*—McDermott, Will & Emery

(57) ABSTRACT

A motion estimation method capable of setting an optimum threshold value and allowing high speed processing includes the steps of: sequentially selecting one of blocks to be searched from a search range; sequentially calculating a difference between corresponding sample values of a reference block and one of blocks to be searched and accumulating an absolute value of difference; comparing an intermediate result of an accumulation value and a prescribed threshold value for a prescribed number of samples and interrupting the step of accumulating the absolute value of difference when the intermediate result exceeds the prescribed threshold value; and making one of blocks to be searched having a minimum final result of the accumulation value correspond to the reference block. The prescribed threshold value is dependent on the reference block. It is noted that the motion estimation apparatus is also disclosed.

16 Claims, 13 Drawing Sheets

OTHER PUBLICATIONS

"Half–pel Precision MPEG2 Motion–Estimation Processor with Concurrent Three–Vector Search", Ishihara et al., ISSCC Digest of Technical Papers, vol. 30, No. 12, Dec. 1995, pp. 1502–1509.

"A Motion Estimation Processor for MPEG2 Video Real Time Encoding at Wide Search Range", Ohtani et al., Proc. IEEE Custom Integrated Circuits Conference, 1995, pp. 405–408.

"A 1.5W Single Chip MPEG2 MP@ML Encoder with Low–Power Motion Estimation and Clocking", Mizuno et al., ISSCC Digest of Technical Papers, 1997, pp. 256–257.

"Adaptive Threshold Setting for Snapping–off Motion Vector Estimation Algorithm", Sasajima et al., The Istitute of Electronics Information and Communication Engineers General Conference, 1998, p. 46.

"Adaptive Threshold Setting for Snapping–off ME Algorithm for Scene Change", Sasajima et al, The Institute of Electronics Information and Communication Engineers General Conference, 1998, p. 47.

* cited by examiner

MOTION ESTIMATION METHOD AND APPARATUS FOR INTERRUPTING COMPUTATION WHICH IS DETERMINED NOT TO PROVIDE SOLUTION

BACKGROUND OF THE INVENTION

1. Field of the Invention

The present invention relates to motion estimation methods and apparatuses used in a digital moving picture compression system, and more particularly to a motion estimation method and an apparatus capable of performing motion estimation with a small amount of computation.

2. Description of the Background Art

A motion estimation apparatus is used in a moving picture compression system for MPEG (Moving Picture Experts Group) and performs a large number of computations. To date, various computation algorithms for the motion estimation apparatus have been proposed. For the moving picture compression system for MPEG, "VLSI Architectures for Video Compression—A Survey", by P. Pirsch et al., *Proc. IEEE* Vol. 83, No. 2, pp. 220–246, 1995 and "ULSI Realization of MPEG2 Realtime Video Encoder and Decoder—An Overview", by M. Yoshimoto et al., *IEICE Trans. Electron.*, Vol. E78-C, No. 12, pp. 1668–1681, 1995 are incorporated herein by reference.

In addition, for an LSI (Large Scale Integration) for motion estimation computation, "A Half-pel Precision MPEG2 Motion-Estimation Processor with Concurrent Three—Vector Search", by K. Ishihara et al., *ISSCC Digest of Technical Papers*, pp. 1502–1509, 1995 and "A Motion Estimation Processor for MPEG2 Video Real Time Encoding at Wide Search Range", by A. Ohtani et al., *Proc. IEEE Custom Integrated Circuits Conference*, pp. 405–408, 1995 are incorporated herein by reference.

A full search method for all samples is conventionally known as the motion estimation method. This is a method for performing a difference calculation of corresponding sample values of one of blocks to be searched and a reference block in every position within a block for every candidate vector in a search range. The method allows correct detection of a vector in a position of a minimum difference value.

However, the full search method for all samples requires a large amount of computation, so that the search range for the vector which can be implemented by a single LSI is limited. Accordingly, the method disadvantageously requires a large number of LSIs to search over a large range. A subsample method has been proposed which performs the difference calculation for some of the positions in each search range for reducing the amount of difference calculation. In addition, an algorithmic search method has been proposed which selects a search position in a search range in accordance with a specific algorithm for performing a difference calculation of one of blocks to be searched and a reference block only for some of search positions. Moreover, various methods have been proposed for searching over a larger search range with a smaller amount of computation by combining the above mentioned methods. A motion picture compression apparatus provided with a motion estimation circuit for motion estimation by employing a combined method of the subsample and algorithmic search methods is described in "A 1.5W Single-Chip MPEG2 MP@ML Encoder with Low-Power Motion Estimation and Clocking", by M. Mizuno et al., *ISSCC Digest of Technical Papers*, pp. 256–257, 1997, which is incorporated herein by reference.

On the other hand, an interruption method has been proposed as a method capable of statically changing the search range in accordance with an original image to be an input rather than the above described static algorithm. In the interruption method, a target difference value is preliminary set. A vector having a difference value which is smaller than the target value is detected. The vector becomes a search result if the difference value of the vector is smaller than that of the next vector. For the interruption method, "Adaptive Threshold Setting for Snapping-off Motion Vector Estimation Algorithm", by Sasajima and Enomoto, *The Institute of Electronics Information and Communication Engineers General Conference*, p. 46, 1998 is incorporated herein by reference.

In both of subsample and algorithmic search methods which have been proposed, the vector is searched in accordance with a statically determined algorithm and not depending on the original image data to be an input. Thus, the vector having a difference value which is the same as or close to that obtained by the full sample method for all samples can be detected for a specific original image data. For another specific original image data, however, a vector having a difference value which is significantly greater than that obtained by the full sample method for all samples is detected, thereby resulting in lower compressibility of moving picture and lower image quality when the compressed moving picture is expanded.

Further, in the interruption method, although the amount of computation is reduced only by about 40% as compared with the case of the full sample method for all samples, a vector having a difference value which is, on the average, significantly greater than that obtained by the full search method is disadvantageously detected.

In addition, the conventional motion estimation apparatus is in most cases designed to operate regularly arranged circuits as high an operating efficiency as possible and in parallel, while making use of the characteristic of the LSI. Thus, the design of such apparatus is focused on increase in the operating efficiency of a calculation circuit, such as calculation of the difference value for a motion vector which is ultimately unnecessary, rather than on reduction in power consumption. As a result, power consumption for the conventional apparatus is significant though calculation performance thereof is high.

In Japanese Patent Laying-Open No. 10-191352, a motion estimation apparatus capable of interrupting computation in accordance with a comparison result with respect to a prescribed threshold value is disclosed. The apparatus is intended for high speed processing. In the apparatus, however, computation cannot be interrupted in the computation for the first position as the threshold value is calculated. Thus, if the number of candidate vectors which can be processed at a time is too large, an effect of interrupting the computation is not obtained. In addition, in this apparatus, although a prescribed threshold value can be preliminary given, properties of the threshold value are not disclosed. Therefore, setting of an optimum threshold value is difficult.

SUMMARY OF THE INVENTION

The present invention is made to solve the aforementioned problems. An object of the present invention is to provide a motion estimation method capable of setting an optimum threshold value and performing a high speed processing.

Another object of the present invention is to provide a motion estimation apparatus capable of setting an optimum threshold value and performing a high speed processing with reduced power consumption.

Still another object of the present invention is to provide a motion estimation apparatus capable of setting an optimum threshold value and performing a high speed processing with reduced power consumption and simplified internal structure.

A motion estimation method according to one aspect of the present invention includes steps of: sequentially selecting one of blocks to be searched from a search range; sequentially calculating a difference between corresponding sample values of a reference block and one of blocks to be searched and accumulating an absolute value of the difference; comparing an intermediate result of an accumulation value and a prescribed threshold value for a prescribed number of samples and interrupting the step of accumulating the absolute value of the difference when the intermediate result exceeds the prescribed threshold value; and making one of blocks to be searched having a minimum final result of the accumulation values correspond to the reference block. The prescribed threshold value is dependent on the reference block.

When the intermediate result exceeds the threshold value, the computation for that one of blocks to be searched can be interrupted. Thus, the process can immediately proceed to computation for next one of blocks to be searched. In addition, as the prescribed threshold value is dependent on the reference block, an optimum threshold value can be set for every reference block. Therefore, high speed processing is achieved.

Preferably, the step of sequentially selecting one of blocks to be searched from the search range includes a step of selecting one of blocks to be searched in the order of a position closer to the reference block.

One of blocks to be searched corresponding to the reference block can be detected in the early stage. Accordingly, calculation for accumulating difference in the following process can be interrupted in the early stage. This is because one of blocks to be searched corresponding to the reference block is generally positioned near the reference block. Thus, high speed processing can be achieved.

More preferably, the step of accumulating the absolute value of difference includes a plurality of steps each sequentially calculating a difference between corresponding sample values of the reference block and one of blocks to be searched and accumulating an absolute value of the difference for every one of plurality of blocks to be searched. The step of interrupting the step of accumulating the absolute value of difference further includes steps of: comparing an intermediate result of an accumulation value and a prescribed threshold value for a prescribed number of samples for each of the plurality of steps of accumulating the absolute value of the difference and interrupting the accumulation process when the intermediate result exceeds the prescribed threshold value; and increasing the prescribed threshold value by a given amount and again performing the plurality of steps of accumulating the absolute value of difference in parallel when the plurality of steps of accumulating the absolute value of difference are all interrupted as the intermediate result of the accumulation value exceeds the prescribed threshold value.

Calculations for accumulating differences for a plurality of blocks to be searched can be performed in parallel. In addition, even if an initial value of the threshold value is too small to allow detection of one of blocks to be searched corresponding to the reference block, a suitable threshold value can be determined by gradually increasing the threshold value. Thus, the calculation for accumulating the difference can be interrupted in the early stage, thereby allowing high speed processing.

A motion estimation apparatus according to another aspect of the present invention includes: a portion for selecting one of blocks to be searched for sequentially selecting one of blocks to be searched from a search range; an absolute difference accumulating portion for sequentially calculating a difference between corresponding sample values of a reference block and one of blocks to be searched and accumulating an absolute value of difference; an accumulating operation interrupting portion connected to an output of the absolute difference accumulating portion for comparing an intermediate result of an accumulation value and a prescribed threshold value every time when calculation of the difference between corresponding sample values of the reference block and one of blocks to be searched is performed a prescribed number of times and interrupting the operation of the absolute difference accumulating portion when the intermediate result exceeds the prescribed threshold value; and a correspondence portion making one of blocks to be searched having a minimum final result of the accumulation value corresponded to the reference block. The prescribed threshold value is dependent on the reference block.

When the intermediate result of the calculation exceeds the threshold value, the motion estimation apparatus can interrupt the calculation for that one of blocks to be searched. Thus, the motion estimation apparatus can proceed to the process for next one of blocks to be searched. In addition, as the prescribed threshold value is dependent on the reference block, the motion estimation apparatus can set an optimum threshold value for every reference block. Thus, high speed processing and reduction in power consumption can be achieved.

Preferably, the absolute difference accumulating portion includes: a subtracter receiving two sample values of the reference block and one of blocks to be searched in corresponding positions; an absolute value computing element connected to the subtracter for receiving an output from the subtracter; an accumulation register storing an accumulation value of an output from the absolute value computing element; and an adder connected to the accumulation register and the absolute value computing element for receiving an output from the absolute value computing element and a value held in the accumulating register and writing an addition result to the accumulation register.

Preferably, the portion for selecting one of blocks to be searched selects one of blocks to be searched in the order of a position closer to the reference block.

The motion estimation apparatus can detect one of blocks to be searched corresponding to the reference block in an early stage. Accordingly, the motion estimation apparatus can interrupt a calculation for accumulating difference in a following process in the early stage. This is because one of blocks to be searched corresponding to the reference block is generally positioned near the reference block. Thus, high speed processing and reduction in power consumption can be achieved.

More preferably, the prescribed threshold value is an intra evaluation value of the reference block.

As the intra evaluation value is the prescribed threshold value, determination is readily made as to whether the reference block per se is coded. More specifically, when one of blocks to be searched corresponding to the reference block is not detected, the motion estimation apparatus may code the reference block per se.

A motion estimation apparatus according to still another aspect of the present invention includes: a portion for selecting one of blocks to be searched for sequentially selecting one of blocks to be searched from a search range; a plurality of registers holding a sample value of one of blocks to be searched and receiving a value of an adjacent register; a plurality of processing portions connected to the plurality of registers for sequentially calculating a difference between corresponding sample values of a reference block and one of blocks to be searched, accumulating an absolute value of difference, comparing an accumulation value and a prescribed threshold value and interrupting an operation when the accumulation value exceeds the prescribed threshold value; a portion connected to the plurality of processing portions for storing an computation result and one of blocks to be searched corresponding to the computation result when the computation result from the processing portion is smaller than the prescribed threshold value; and a threshold value managing portion applying a prescribed threshold value to each of the plurality of processing portions, increasing the prescribed threshold value by a given amount and again applying it to the plurality of processing portions when all of the operations of the plurality of processing portions are interrupted as the accumulation value exceeds the prescribed threshold value. The prescribed threshold value is dependent on the reference block.

The motion estimation apparatus can perform calculations for accumulating differences for the plurality of blocks to be searched in parallel. In addition, even when an initial value of the threshold value is too small to allow detection of one of blocks to be searched corresponding to the reference block, the motion estimation apparatus can determine a suitable threshold value by gradually increasing the threshold value. Thus, the motion estimation apparatus can interrupt a calculation for accumulating difference in the early stage, thereby allowing high speed processing and reduction in power consumption. Further, as the prescribed threshold value is dependent on the reference block, the motion estimation apparatus can set an optimum threshold value for every reference block.

Preferably, each of the above mentioned plurality of processing portions includes: a first gate receiving a sample of the reference block; a second gate receiving a sample of one of blocks to be searched; an absolute difference sum computing element connected to the first and second gates for receiving outputs from the first and second gates; a latch connected to an output of the absolute difference sum computing element; an adder receiving an output from the latch and an accumulation value of an output from the absolute difference sum computing element; an accumulation register connected to an output of the adder for holding the accumulation value; a comparison computing element receiving a value of the accumulation register and the prescribed threshold value for outputting the value of the accumulation register and a comparison result of the value of the accumulation register and the prescribed threshold value; and a circuit connected to an output of the comparison computing element for applying a signal in accordance with a comparison result of the value of the accumulation register and the prescribed threshold value to the first and second gates.

More preferably, the prescribed threshold value is a minimum value of the final results of the accumulation values which have been obtained for a reference block in a preceding frame which is in the same position as that of the current frame.

The motion estimation apparatus sets, as the prescribed threshold value, the minimum value of the final results of the accumulation values which have been obtained for the reference block in the preceding frame which is in the same position as that of the current frame. Properties of the images in the same positions are similar even if the images are in adjacent frames. Thus, the optimum threshold value can be set.

More preferably, the motion estimation apparatus further includes a portion for detecting a scene change. The prescribed threshold value is one of a value which depends on the reference block in a current frame and that in a preceding frame, both of which are determined depending on occurrence of the scene change.

The motion estimation apparatus can set the optimum threshold value even when the scene change occurs. If the scene change occurs, a value corresponding to the reference block in the preceding frame should not be used as a threshold value. This is because the property of the image has changed due to the scene change. As a result, motion estimation apparatus can set the optimum threshold value by using the value corresponding to the current frame as the threshold value when the scene change occurs.

More preferably, the motion estimation apparatus further includes a plurality of reference value registers connected to the plurality of processing portions for holding sample data of the reference blocks.

The motion estimation apparatus can perform processes for the plurality of reference blocks in parallel by grouping the plurality of processing portions and making each group correspond to a different reference block. Thus, high speed processing and reduction in power consumption can be achieved.

More preferably, the motion estimation apparatus further includes: a bus for supplying a sample value of the reference block for the plurality of processing portions; and a plurality of threshold value registers connected to a bus and a plurality of processing portions for holding the threshold value. The bus allows transfer of the threshold value and the sample value of the reference block in first and second periods, respectively.

An internal structure of the apparatus is simplified as the bus is used both for applying the prescribed threshold value and for applying the sample value of the reference block.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
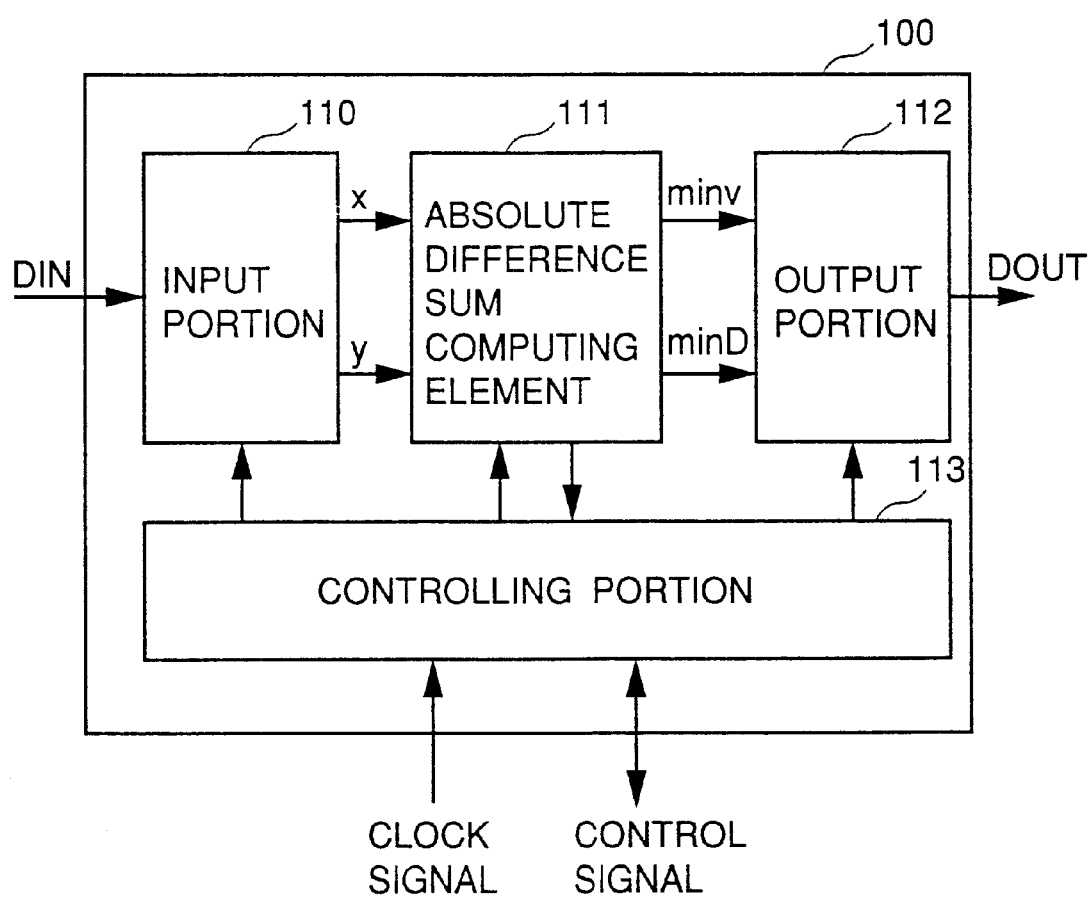
FIG. 1 is a diagram showing a structure of an adaptive motion estimation apparatus 100 according to a first embodiment of the present invention.

Now, an adaptive motion estimation apparatus as one embodiment of the present invention will be described with reference to the drawings. It is noted that the same parts are denoted by the same reference characters in the following description. As the names and functions of the same parts are also the same, description thereof will not be repeated.

First Embodiment

An adaptive motion estimation apparatus according to the present embodiment performs a static subsample and static algorithmic search for every reference block while adapting to an input data, which is to be one of blocks to be searched of that reference block.

Referring to FIG. 1, an adaptive motion estimation apparatus 100 according to the present embodiment includes: an input portion 110, an absolute difference sum computing element 111 connected to an output of input portion 110; an output portion 112 connected to an output of absolute difference sum computing element 111; and a controlling portion 113 for controlling input portion 110, absolute difference sum computing element 111 and output portion 112.

Figure 2B:
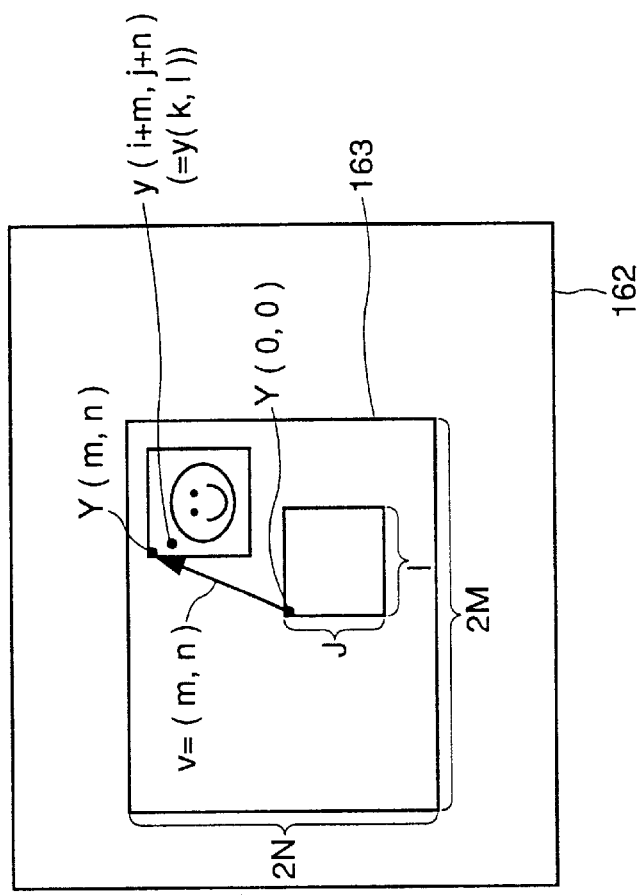
FIGS. 2A and 2B are diagrams showing a positional relation between a reference block and one of blocks to be searched.
Figure 2A:
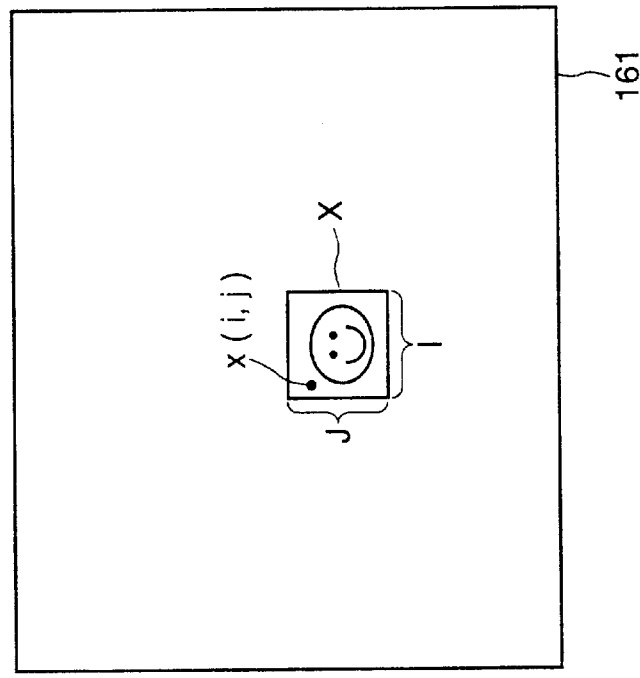

Referring to FIGS. 2A and 2B, input portion 110 receives an image data of a current frame (a reference frame) 161 and that of a preceding frame (an image frame to be searched) 162 for sequentially outputting (I×J) sample data x (i, j) in a reference block X. Input portion 110 sequentially outputs (I×J) sample data y (i+m, j+n) (=y (k, l)) in one of blocks to be searched Y (m, n) ( m=–M~M–1, n=–N~N–1) having a dimension of I×J corresponding to (2M×2N) vectors v=(m, n) in a search range 163, which has a dimension of 2M×2N and a center corresponding to an upper left corner of reference block X.

Absolute difference sum computing element 111 sequentially receives sample data x (i, j) (hereinafter referred to as "sample data x") output from input portion 110 and sample data y (k, l) (hereinafter referred to as "sample data y"). Absolute difference sum computing element 111 calculates an absolute difference sum D(m, n) between reference block X and (2M×2N) blocks to be searched Y (m, n). Absolute difference sum computing element 111 outputs a value minD when absolute difference sum D(m, n) is minimum and values of m and n when the absolute difference sum is minimum, that is, a vector minv=(minm, minn). Output portion 112 receives minimum absolute difference sum minD and vector minv=(minm, minn) and outputs these values at a suitable timing.

Figure 3:
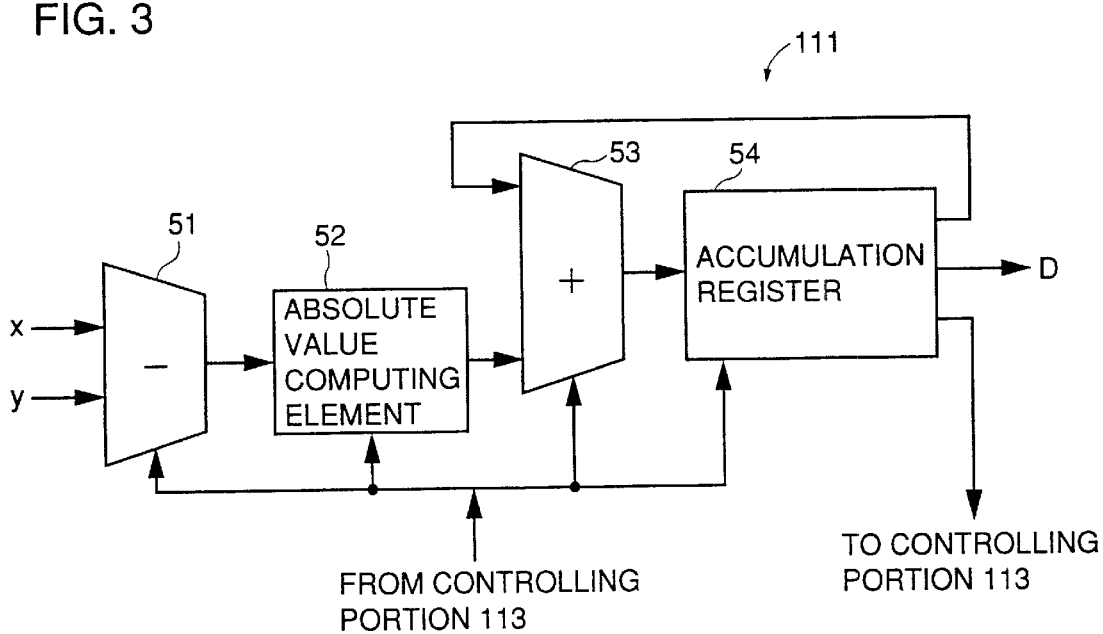
FIG. 3 is a diagram showing a structure of an absolute difference sum computing element 111.

Referring to FIG. 3, absolute difference sum computing element 111 includes: a subtracter 51 receiving sample data x and y; an absolute value computing element 52 receiving a subtraction result from subtracter 51; an adder 53 receiving an output from absolute value computing element 52 and a value held in an accumulation register 54 which will later be described; an accumulation register 54 for holding an output from adder 53; and a circuit (not shown) for output absolute difference sum D to controlling portion 113. Subtracter 51, absolute value computing element 52, adder 53 and accumulation register 54 operate in accordance with a control signal output from controlling circuit 67 of controlling portion 113, which will later be described.

Figure 4:
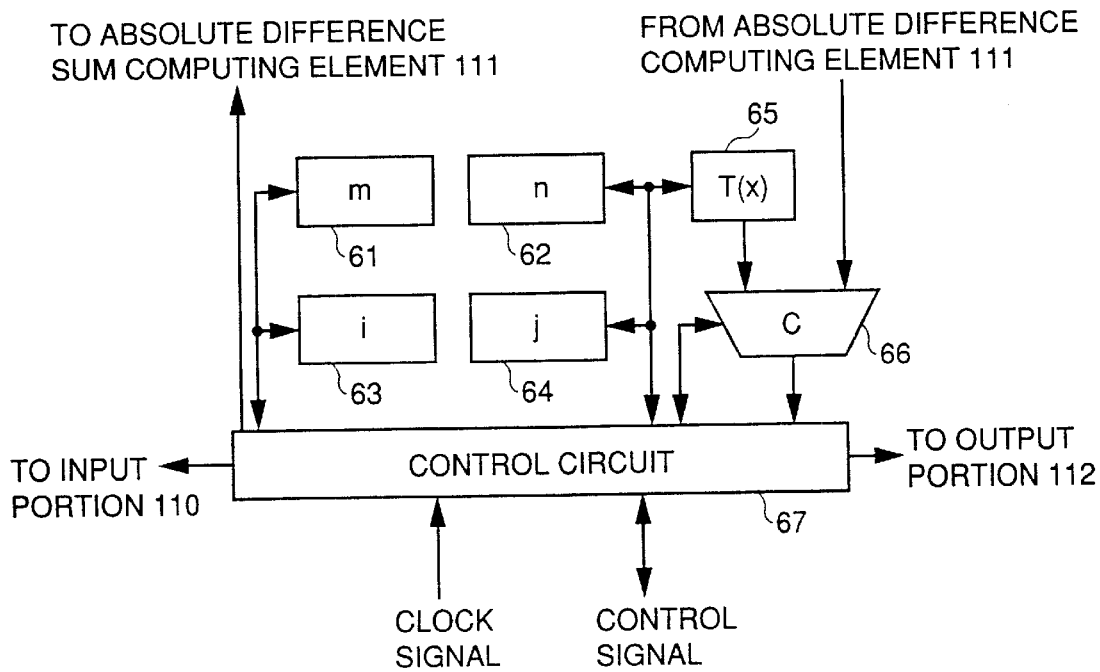
FIG. 4 is a diagram showing a structure of a controlling portion 113.

Referring to FIG. 4, controlling portion 113 includes: registers 61 and 62 respectively holding elements of vector v=(m, n) and those when the absolute difference sum calculated in absolute difference sum computing element 111 is minimum; registers 63 and 64 for storing values of a coordinate (i, j) in the reference block; a register 65 for holding a target difference value T (X) which will later be described; a comparator 66 for comparing target difference value T (X) and a value held in accumulation register 54 in FIG. 3; and a controlling circuit 67 for controlling operations of input portion 110, absolute difference sum computing element 111, output portion 112 and controlling portion 113.

Figure 5:
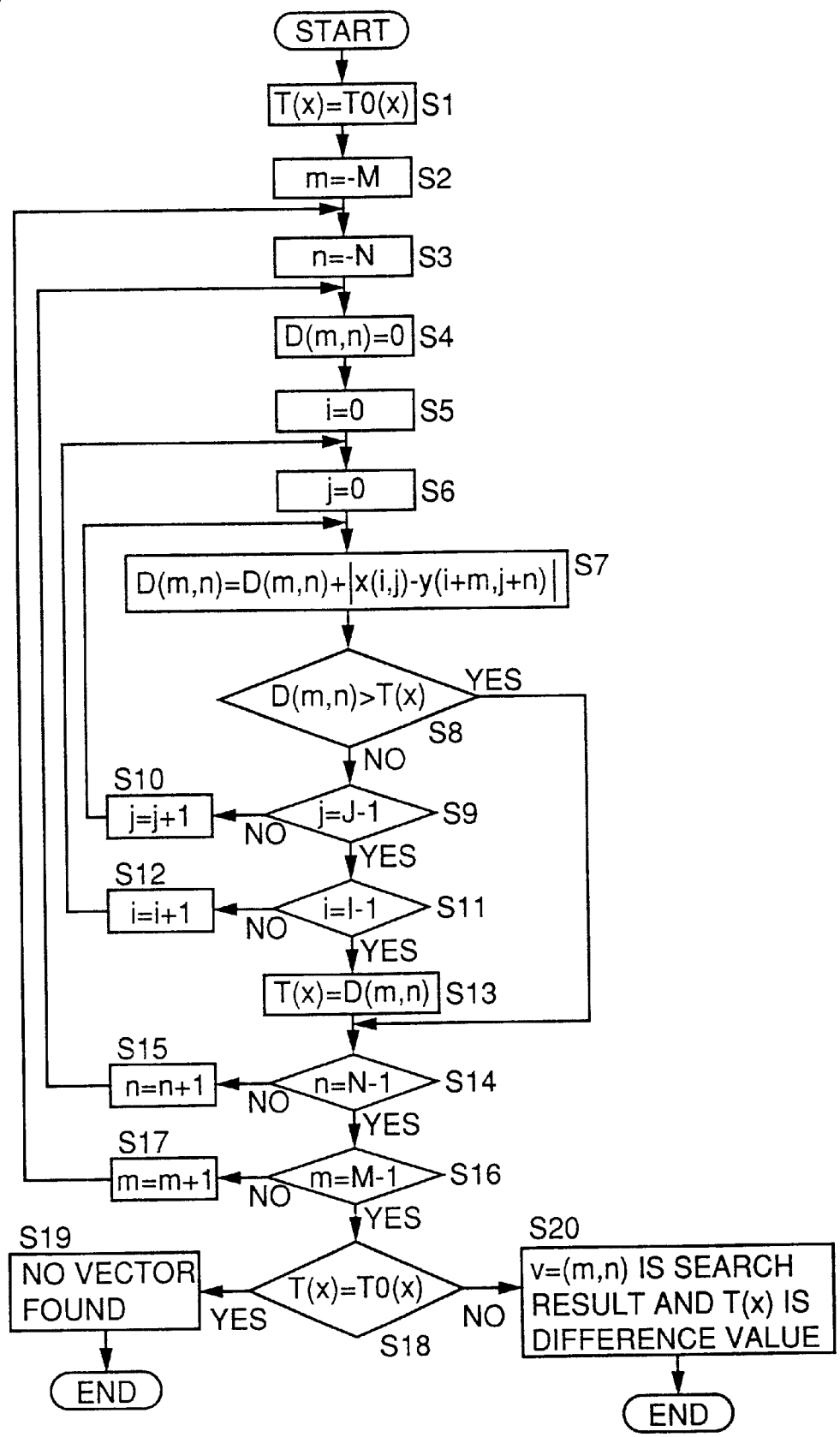
FIG. 5 is a flow chart showing an operation of adaptive motion estimation apparatus 100.

Referring to FIG. 5, each portion of adaptive motion estimation apparatus 100 operates as follows. Controlling circuit 67 sets an intra evaluation value which is a sum obtained by accumulating an absolute value of a sample data in reference block X as an initial value T0 (X) of target difference value T (X) (S1). It is noted that the intra evaluation value is not limited to this and, generally, is dependent on the sample data. A vector v=(–M, –N) is set which is the initial value and directed to the upper left corner of the initial value of reference block X (S2–S3). As an absolute difference sum D (m, n) for vector v=(m, n), 0 is set. In other words, accumulation register 54 is reset (S4). Values of counters i and j representing coordinate (i, j) on the reference block are both set to 0 (S5–S6). Subtracter 51 calculates a difference value between sample data x (i, j) and y (i+m, j+n), and absolute value computing element 52 calculates an absolute value of the difference. Adder 53 performs addition of the absolute difference value and the value in accumulation register 54, and a result D (m, n) is held in accumulation register 54 (S7). Comparator 66 compares absolute difference sum D (m, n) and target difference value T (X). If absolute difference sum D (m, n) is smaller than target difference value T (X) (NO in S8), determination is made as to whether value j of a y coordinate on the reference block has attained to (J–1) (S9). If value j has not attained to (J–1) (NO in S9), value j is incremented by one (S10) and the process returns to S7. If value j has attained to (J–1) (YES in S9), determination is made as to whether value i of an x coordinate on the reference block has attained to (I–1) (S11). If value i has not attained to (I–1) (NO in S1), value i is incremented by one (S12) and the process returns to S6.

If value i has attained to (I–1) (YES in S11), it means that absolute difference sum D (m, n) for vector v=(m, n) has been obtained and that absolute difference sum D (m, n) is minimum of all values obtained so far. Thus, absolute difference sum D (m, n) is set to a new target difference value T (X). In addition, vector v=(m, n) at the time is stored as minv=(minm, minn) (S13). Thereafter, a process in S14 is performed. If absolute difference sum D (m, n) exceeds target difference value T (X) during calculation of absolute difference sum D (m, n) for a certain vector v=(m, n) (YES in S8), the absolute difference sum for that vector would not be a minimum value even with further calculation of the absolute difference sum. Thus, the calculation of absolute difference sum D (m, n) is interrupted at that point, and the process proceeds to S14.

In S14, determination is made as to whether an element n of vector v has attained to (N−1). If element n has not attained to (N−1) (NO in S14), it is incremented by one (S15), and the process returns to S4. If element n has attained to (N−1) (YES in S14), determination is made as to whether an element m of vector v has attained to M−1) (S16). If element m has not attained to (M−1) (NO in S16), element m is incremented by one (S17), and the process returns to S3. If element m has attained to (M−1) (YES in S16), it means that search for every vector has been completed, so that target difference value T (X) and intra evaluation value T0 (X) are compared (S18). If target difference value T (X) and intra evaluation value T0 (X) are equal (YES in S18), it means that no absolute difference sum D (m, n) for any vector v=(m, n) could be smaller than intra evaluation value T0 (X) which is the initial target difference value T (X). Thus, controlling circuit 67 determines that a block to be searched Y (m, n) which is the most similar to reference block X has not been found (S19).

When target difference value T (X) and the intra evaluation value which has been set as initial value T0 (X) are different (NO in S18), a value which has been set as target difference value T (X) is output to output portion 112 through absolute difference sum computing element 111 (FIG. 1) as a minimum absolute difference sum minD. Further, a vector minv=(minm, minn) is output to output portion 112 through absolute difference sum computing element 111 as a vector when absolute difference sum D (m, n) is minimum (S20).

In the motion estimation apparatus, only one vector minv=(minm, minn) may be detected when absolute difference sum D (m, n) is a minimum value for vector v=(m, n) in the search range. Thus, absolute difference sum D (m, n) for other vectors v=(m, n) is not necessary. In adaptive motion estimation apparatus 100 according to the present embodiment, when an intermediate result of calculation exceeds target difference value T (X) in a process of calculating absolute difference sum D (m, n) for vector v=(m, n), it is determined that absolute difference sum D (m, n) for that vector v=(m, n) cannot be a minimum value. Thus, the calculation is interrupted. Therefore, an amount of calculation is significantly reduced as compared with the conventional motion estimation apparatus which performs a calculation of absolute difference sum D (m, n) corresponding to each vector v=(m, n) for every sample data. Further, reduction in the amount of calculation enables high speed processing and reduction in power consumption.

In addition, adaptive motion estimation apparatus 100 uses an intra evaluation value, which is an accumulation sum of an absolute value of each sample data in the reference block, as initial value T0(X) of target difference value T(X). Thus, assuming the moving picture compression system using adaptive motion estimation apparatus 100, when vector v=(m, n) is not found, reduction in compression efficiency is prevented by performing image compression for the reference block per se.

Second Embodiment

Figure 6:
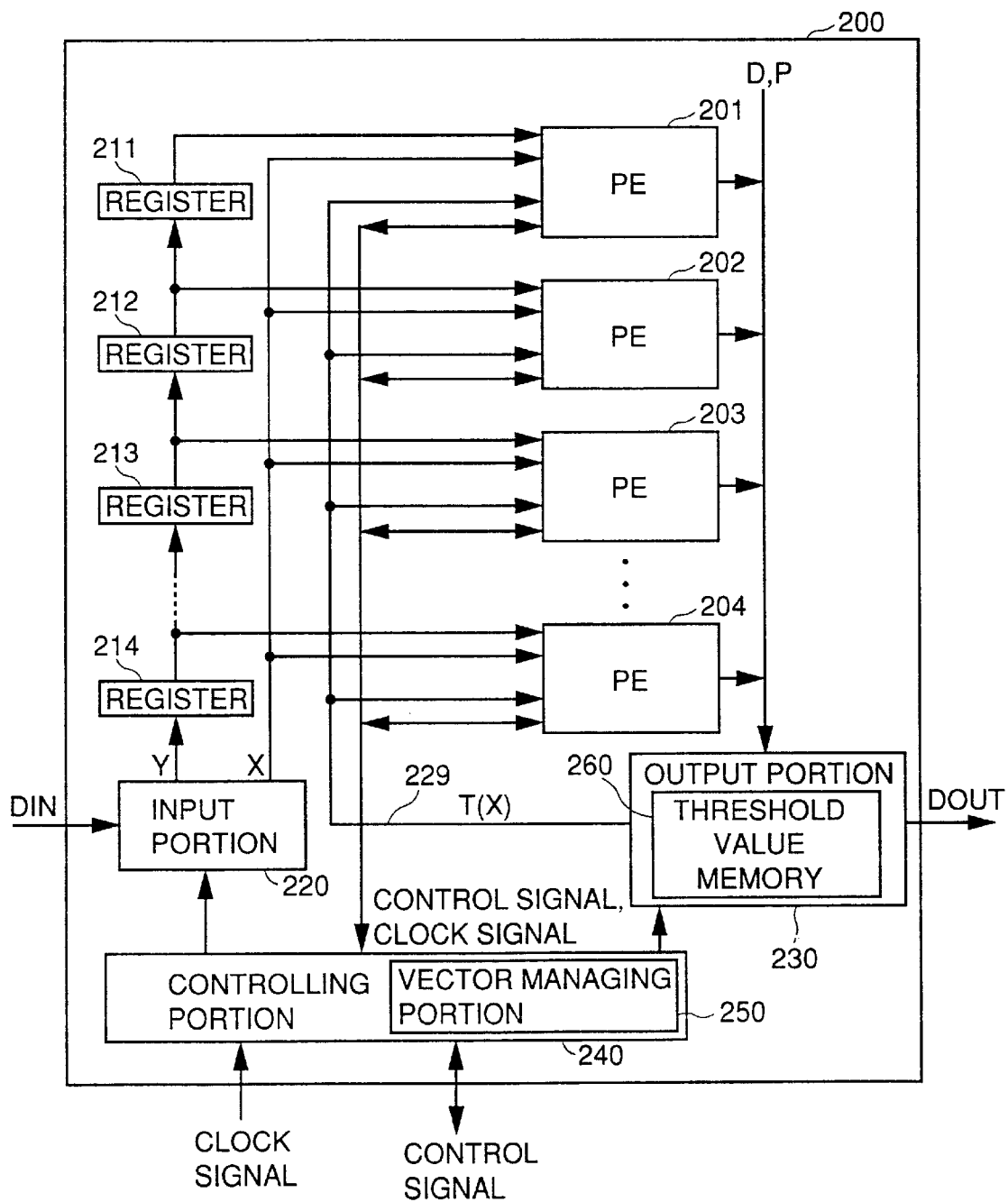
FIG. 6 is a diagram showing a structure of an adaptive motion estimation apparatus 200 according to a second embodiment of the present invention.

Referring to FIG. 6, an adaptive motion estimation apparatus 200 according to the present embodiment includes: an input portion 220 for sequentially receiving an image data of a moving picture frame for sequentially outputting a sample data x of a reference block X and a sample data y of one of blocks to be searched Y (m, n); registers 211 to 214 holding sample data y of one of blocks to be searched Y (m, n) and connected to adjacent registers; a plurality of processing elements (hereinafter abbreviated as "PE") 201 to 204 receiving sample data y of one of blocks to be searched Y(m, n) from registers 211 to 214, sample data x of reference block X from the input portion and a target difference value T(X) from an output portion 230 which will later be described for calculating an absolute difference sum D (m, n) of reference block X and one of blocks to be searched Y (m, n) in accordance with a control signal and a clock signal output from a controlling portion 240 which will later be described; output portion 230 receiving absolute difference sum D (m, n) output from PEs 201 to 204 and outputting a minimum value minD of absolute difference sum D (m, n) at a suitable timing for holding a target difference value T (X) required when calculating absolute difference sum D (m, n) at a threshold value memory 230; and controlling portion 240 controlling each part of the structure, having a vector managing portion 250 managing an element of vector v=(m, n) and holding a vector minv=(minm, minn) when absolute difference sum D (m, n) is minimum.

Figure 7:
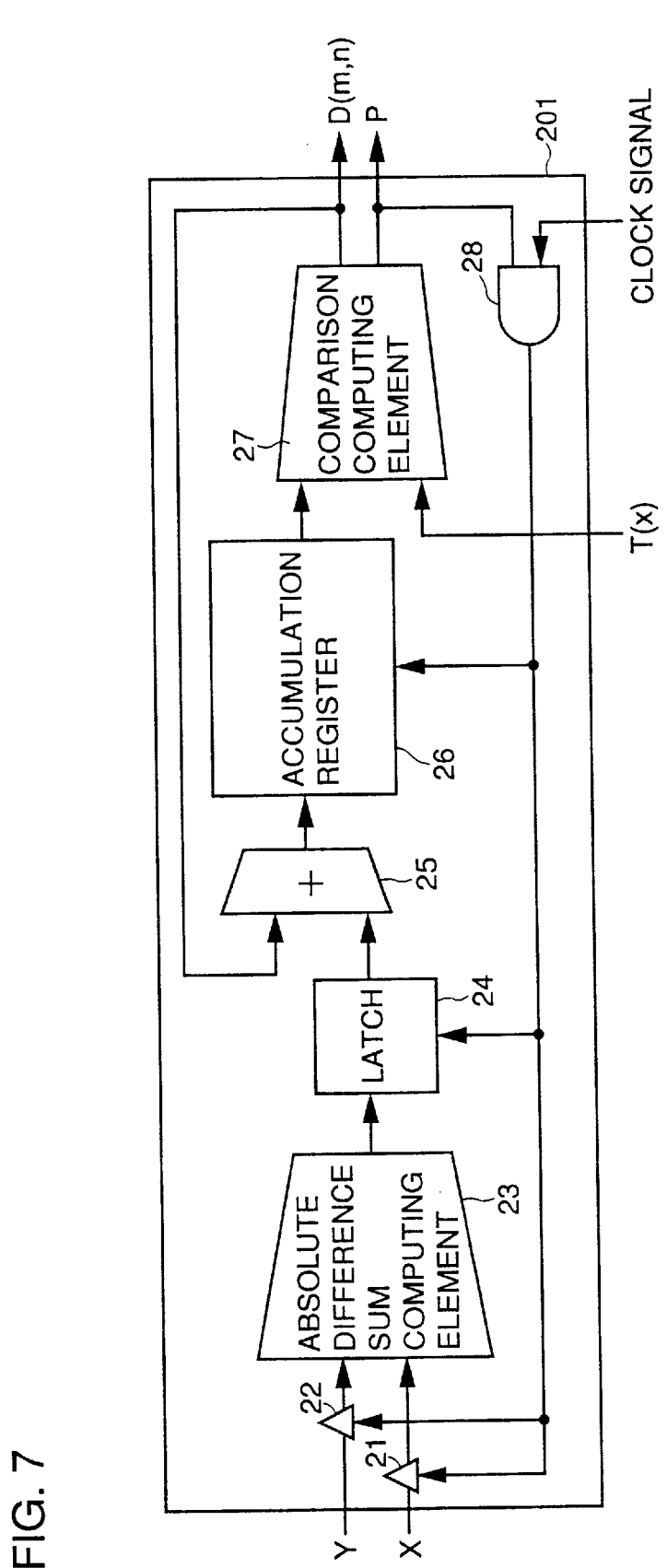
FIG. 7 is a diagram showing a structure of a processing element (PE) 201.

Referring to FIG. 7, an internal structure of PE 201 will be described. It is noted that internal structures of PEs 202 to 204 are the same as that of PE 201, and therefore the description thereof will not be repeated. PE201 includes: gates 21 and 22 respectively receiving sample data x and y; an absolute difference sum computing element 23 connected to outputs of gates 21 and 22 for calculating an absolute difference sum of sample data x and y; a latch 24 connected to an output of absolute difference sum computing element 23; an adder 25 receiving an output from latch 24 and an output D (m, n) from a comparison computing element 27 which will later be described; an accumulation register 26 for holding a value of adder 25; a comparison computing element 27 receiving a value held in accumulation register 26 and a target difference value T (X) applied from output portion 230; and an AND gate 28 having two inputs respectively connected to an output P of comparison computing element 27 and a clock signal output from controlling portion 240. Each of gates 21 and 22 opens a gate at the rise or fall of the clock signal output from AND gate 28. Output D (m, n) from comparison computing element 27 is a value held in accumulation register 26. An output P from comparison computing element 27 is 0 when the value held in accumulation register 26 exceeds target difference value T (X), and otherwise it is 1.

When output P from comparison computing element 27 is 0, 0 is applied to one of inputs of AND gate 28. Thus, an output from AND gate 28 is always 0, and values of sample data x and y cannot pass through gates 21 and 22, respectively. Accordingly, power consumption in this case is negligibly small as compared with that for the operation of PE 201.

Figure 8:
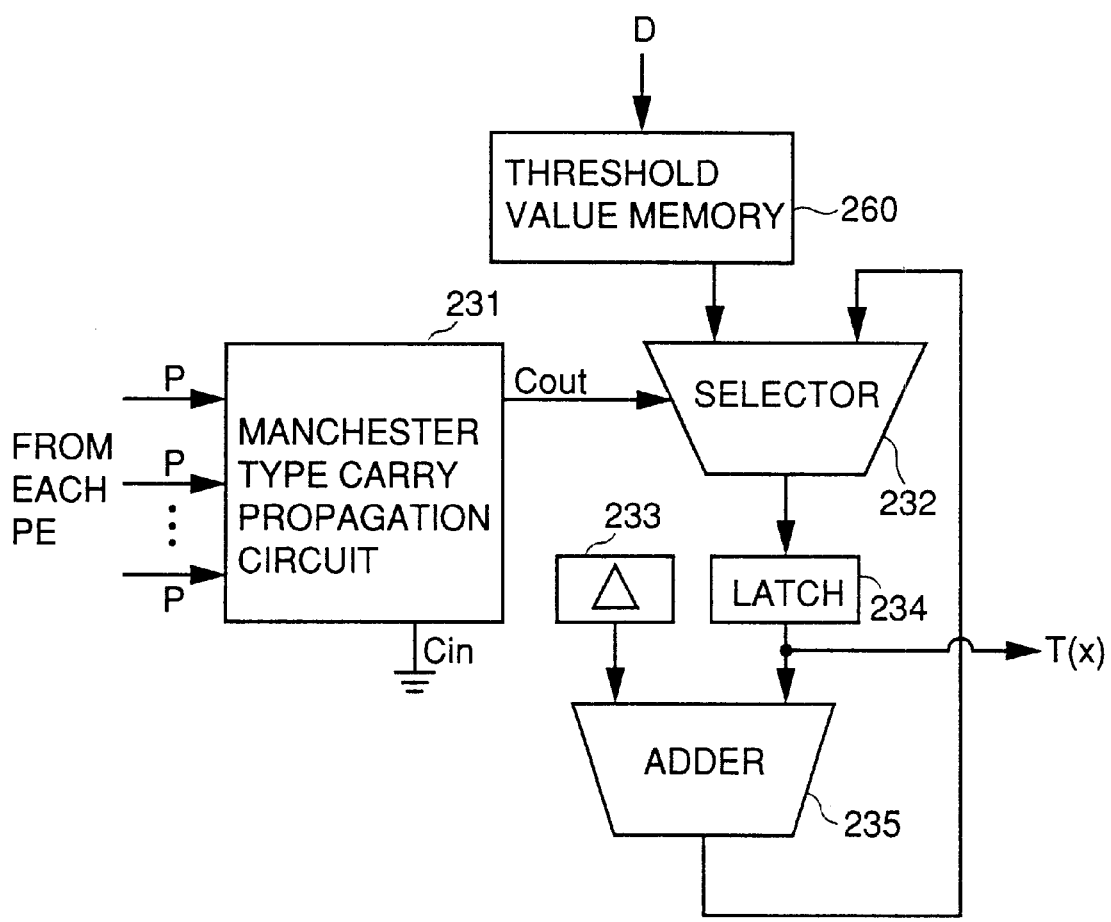
FIG. 8 is a diagram showing a structure of a threshold value updating circuit included in an output portion 230.

Referring to FIG. 8, a structure of a threshold value updating circuit included in output portion 230 will be described. The circuit adds a given amount Δ to a target difference value T (X) to obtain an updated target difference value T (X) when all of absolute difference sums D (m, n) calculated in PEs 201 to 204 exceed target difference value T (X). The threshold value updating circuit includes: a threshold value memory 260 for holding absolute difference sums D (m, n) which are output from PEs 201 to 204 and are equal to or smaller than target difference value T (X); a Manchester type carry propagation circuit 231 connected to outputs of comparison computing elements 27 of PEs 201 to 204 for outputting 0 when all of outputs P from comparison computing elements 27 are 0 and otherwise outputting 1; a selector 232 selecting and outputting an addition result of adder 235, which will be later described, when an output from Manchester type carry propagation circuit 231 is 0, and selecting and outputting a value held in threshold value memory 260 when the output from Manchester type carry propagation circuit 231 is 1; a latch 234 for holding an output from selector 232; a register 233 for holding the above mentioned given amount Δ; and an adder 235 receiving values held in register 233 and latch 234. It is noted that the Manchester type carry propagation circuit is described in detail in U.S. Pat. No. 4,802,112.

Figure 9:
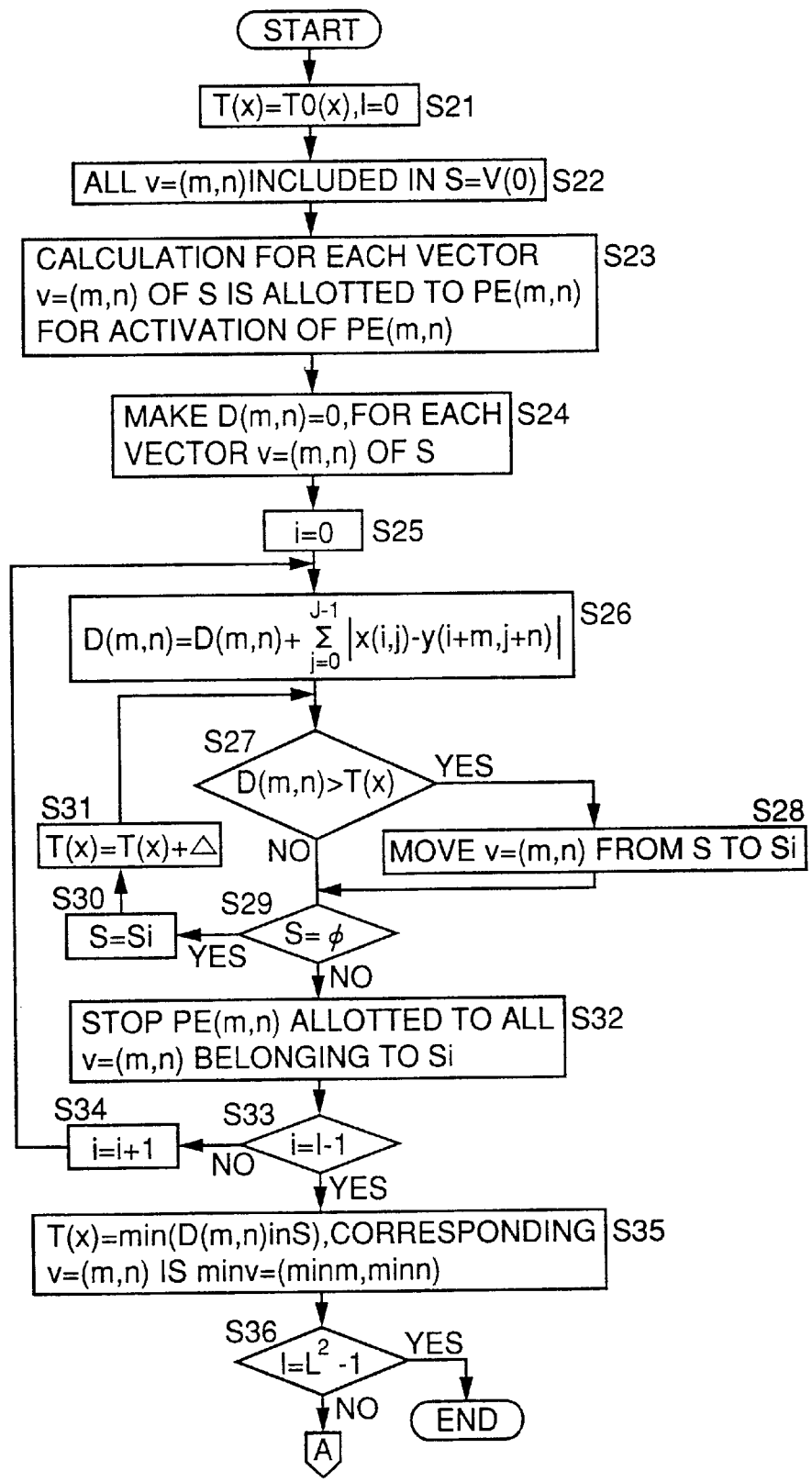
FIGS. 9 and 10 are flow charts showing an operation of adaptive motion estimation apparatus 200.
Figure 10:
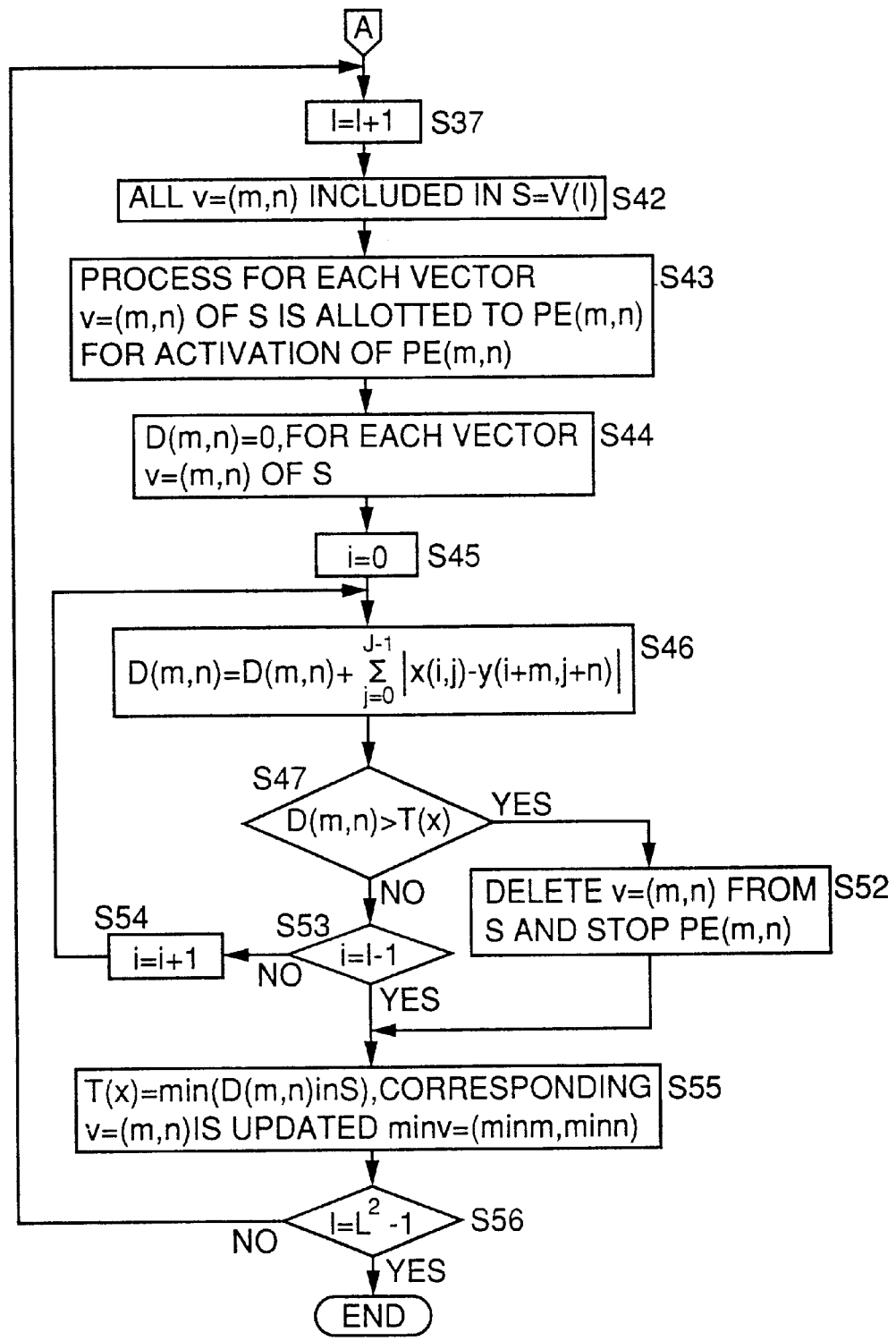

Referring to FIGS. 9 and 10, each portion of adaptive motion estimation apparatus 200 operates as follows. Adaptive motion estimation apparatus 200 divides a search range 163 for one reference block X into L portions along x and y axes to obtain $L^2$ subregions for processing. Each subregion is called V (l). Here, l is an integer between 0 and $(L^2-1)$. In addition, lengths of subregion V (l) along x and y axes are 2M (l) and 2N (l), respectively.

Output portion 230 sets an initial value T0 (X) of target difference value T (X). Initial value T0 (X) is a minimum absolute difference sum minD calculated for reference block X in a preceding frame in the same position as that of reference block X of a current frame. A set S is rendered an empty set, where l=0 (S21).

Further, (2M (0)×2N (0)) vectors v (m, n) in subregion V (0) are elements of set S. Here, assume that m and n are an integer between (A (0)−M (0)) and (A (0)+0(M (0)−1)) and an integer between (B (0)−N (0)) and (B (0)+(N (0)−1)), respectively (S22). It is noted that A (0) and B (0) are respectively x and y coordinates at the center of subregion V (0).

PEs 201 to 204 are allotted to (2M (0)×2N (0)) vectors v=(m, n), and PEs 201 to 204 are activated (S23). The allotted PEs are hereinafter referred to as PEs (m, n). Each PE (m, n) initially sets 0 for absolute difference sum D (m, n) in order to calculate absolute difference D (m, n) between reference block X and one of blocks to be searched Y(m, n) defined by vector v=(m, n). More specifically, accumulation register 26 is reset (S24). Further, 0 is set for a column number i indicating x coordinate of each sample in reference block X (S25).

PEs (m, n) are operated in parallel. Each PE (m, n) calculates absolute difference sum D (m, n) for the $i^{th}$ column between reference block X and one of blocks to be searched Y (m, n)(S26). In other words, each PE (m, n) calculates and accumulates an absolute value of difference between sample x (i, j) of reference block X and sample y (i+m, j+n) of one of blocks to be searched Y (m, n) while changing a row number j from 0 to (J−1).

For each vector v=(m, n), determination is made as to whether absolute difference sum D (m, n) calculated for up to the $i^{th}$ column exceeds target difference value T (X) (S27). If absolute difference sum D (m, n) exceeds target difference value T (X) (YES in S27), corresponding vector v=(m, n) is moved from set S to a set Si (S28). If absolute difference sum D (m, n) equals to or smaller than target difference value T (X)(NO in S27), nothing is performed. Processes in S27 and S28 are performed for every vector v=(m, n) in set S.

After S27 and S28, determination is made as to whether set S is an empty set or not (S29). If set S is the empty set (YES in S29), that is, if all of absolute differences D (m, n) exceed target difference value T (X), all elements of set Si are move to set S (S30). Further, target difference value T (X) is incremented by a given amount Δ(S31). Thereafter, S27 is again repeated.

If set S is not the empty set (NO in S29), that is, if at least one absolute difference D (m, n) is equal to or smaller than target difference value T (X), the calculation in PE (m, n) for every vector v=(m, n) belonging to set Si is interrupted (S32). Determination is made as to whether column number i has attained to (I−1) (S33). If column number i has not attained to (I−1) (NO in S33), column number is incremented by 1 (S34), and S26 and following steps are repeated. If column number has attained to (I−1) (YES in S33), a minimum value of absolute difference sum D (m, n) corresponding to vector v=(m, n) left in set S is stored as target difference value T (X). In addition, vector v=(m, n) for minimum absolute difference sum D (m, n) is stored as a vector minv=(minm, minn) (S35).

Determination is made as to whether a counter l has attained to $(L^2-1)$, that is, whether the calculation of absolute difference sum for every subregion V (l) has been completed (S36). If counter l has attained to $(L^2-1)$ (YES in S36), the process is interrupted. If counter l has not attained to $(L^2-1)$ (NO in S36), counter l is incremented by one (S37).

Then, (2M (l)×2N (l)) vectors v=(m, n) in subregion V (l) are rendered elements of set S. Here, m and n are an integer between (A (l) M (l)) and (A (l)+(M (l)−1)) and an integer between (B (l)−N (l)) and (B (l)+(N(l)−1)) (S42). It is noted that A (l) and V (l) are respectively x and y coordinates at the center of subregion V (l).

PEs (m, n) are allotted to each of (2M (l)×2M (l)) vectors v=(m, n), and then activated (S43). Absolute difference sum D (m, n), which is a calculation result from each PE (m, n), is initially set to 0 (S44). In other words, accumulation register 26 is reset (S44). In addition, 0 is set for column number i indicating x coordinate of each sample in reference block X (S45).

PEs (m, n) are operated in parallel. Each PE (m, n) calculates absolute difference sum D (m, n) for the $i^{th}$ column between reference block X and one of blocks to be searched Y (m, n) (S46). In other words, each PE (m, n) calculates an absolute value of difference between a sample x (i, j) of reference block X and a sample y (i+m, j+n) of one of blocks to be searched Y (m, n) and accumulates the absolute value of difference while changing row number j from 0 to (J−1).

For each vector v=(m, n), determination is made as to whether absolute difference sum D (m, n) obtained for up to the $i^{th}$ column exceeds target difference value T (X) (S47). If absolute difference sum D (m, n) exceeds target difference value T (X) (YES in S47), corresponding vector v=(m, n) is deleted from set S, and the calculation in PE (in, n) is interrupted (S52).

If absolute difference sum D (m, n) does not exceed target difference value T (X) (NO in S53), column number i is incremented. Further, the calculation of absolute difference sum D (m, n) is continued for PE (m, n) where calculation has not been interrupted (S46).

If column number i has attained to (I−1) (YES in S53), a minimum value of absolute difference sum D (m, n) corresponding to vector v=(m, n) which has been left in set S is stored as an updated target difference value T (X). Further, vector v=(m, n) for minimum absolute difference sum D (m, n) is stored as a vector minv=(minm, minn) (S55).

Determination is made as to whether counter 1 has attained to ($L^2-1$), that is, whether the calculation of absolute difference sum for every subregion V (l) has been completed (S56). If counter l has attained to ($L^2-1$) (YES in S56), the process is interrupted. If counter l has not attained to ($L^2-1$) (NO in S56), S37 and following steps are repeated.

Figure 11:
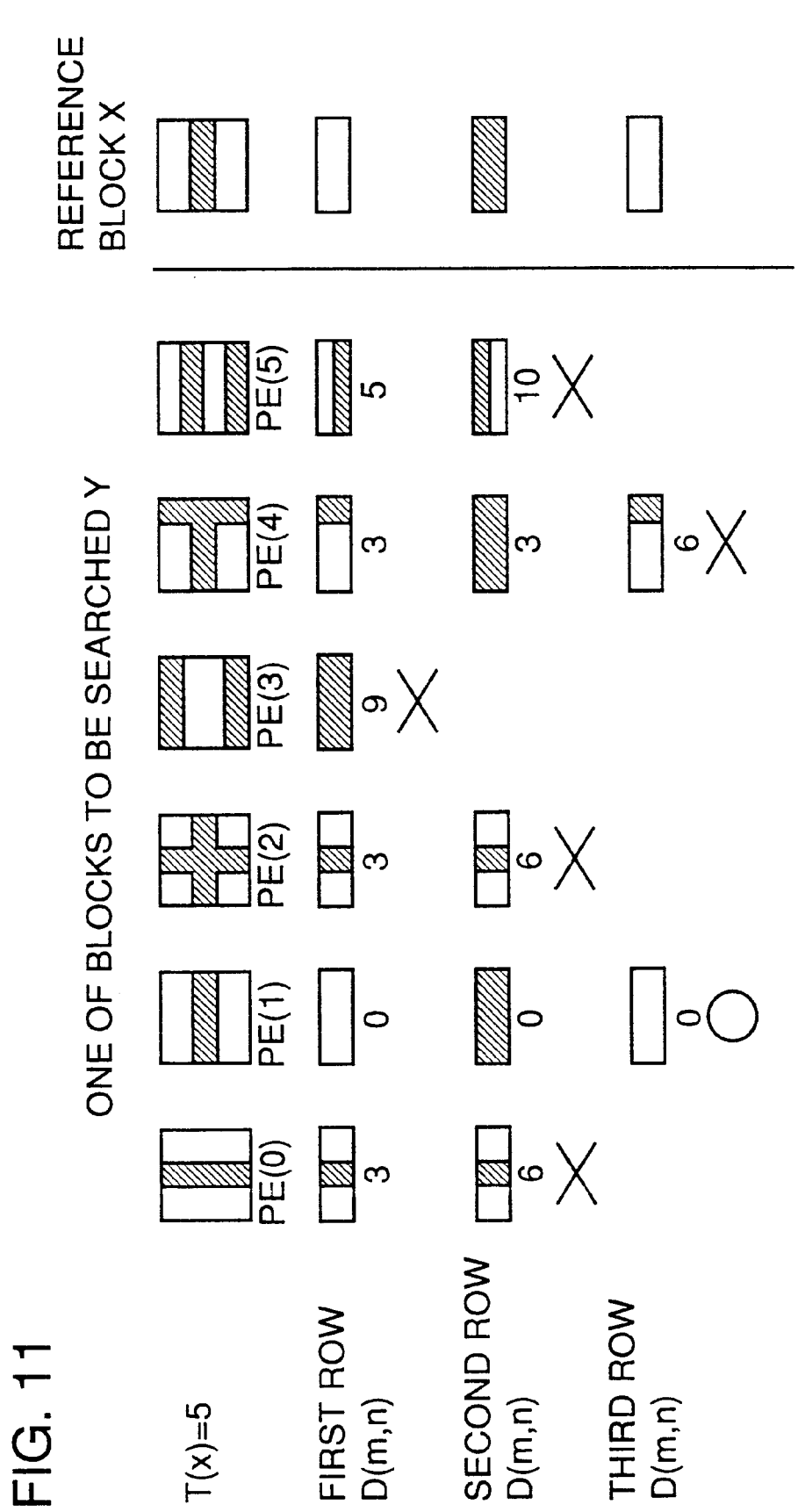
FIG. 11 is a diagram shown in conjunction with a process for calculating a sum of an absolute value of difference using adaptive motion estimation apparatus 200.

Referring to FIG. 11, an exemplary process for calculating the absolute difference sum using adaptive motion estimation apparatus 200 will be described. In this example, target difference value T (X) is 5, and absolute difference sum calculations for six different blocks to be searched Y with respect to reference block X are respectively performed using six PEs (PE (0)–PE (5)). Each of reference block X and six different blocks to be searched Y includes samples in three rows and three columns. In addition, unlike the flow charts shown in FIGS. 9 and 10, absolute difference sum D (m, n) is obtained for every row.

Assume that calculation results obtained from PE (0) to PE (5) for the sample data in the first row are respectively 3, 0, 3, 9, 3 and 5. As the calculation result of PE (3) exceeds target difference value T (X) at this point, PE (3) interrupts the process. The calculation for a second row is performed in each of five PEs excluding PE (3).

Assume that the calculation results of PE (0) to PE (2), PE (4) and PE (5) for sample data in the second row are 6, 0, 6, 3 and 10, respectively. As the calculation results of PE (0), PE (2) and PE (5) exceed target difference value T (X) at this point, PE (0), PE (2) and PE (5) interrupt the processes. Calculation for the third row is performed in each of the remaining two PEs.

Assume that the calculation results of PE (1) and PE (4) for sample data in the third row are 0 and 6, respectively. As the calculation result of PE (4) exceeds target difference value T (X) at this point, PE (4) interrupts the process. Eventually, the calculation result of PE (1) is detected as minimum absolute difference sum minD, and a vector corresponding to PE (1) becomes the search result. In this example, one PE and four PEs are respectively interrupted in the calculations for sample data in the second and third rows. Thus, an operating efficiency of PE would be reduced to 13/18 of that in the case where the calculation of the PE is not interrupted. In addition, power consumption of the PE during interruption is negligibly small as compared with that during operation. Therefore, power consumption of the PE is also reduced to 13/18.

In the motion estimation apparatus, at least one vector minv=(minm, minn) when absolute difference sum D (m, n) is minimum may be detected for vector v=(m, n) in the search range. Thus, absolute difference sum D (m, n) for other vectors v=(m, n) is not necessary. Adaptive motion estimation apparatus 200 according to the present embodiment determines that, when the intermediate result exceeds target difference value T (X) in the process of calculating absolute difference sum D (m, n) for vector v=(m, n), absolute difference sum D (m, n) for that vector v=(m, n) cannot be a minimum value, and interrupts the calculation. Therefore, the amount of computation is significantly reduced is compared with the conventional motion estimation apparatus performing the calculation of absolute difference sum D (m, n) corresponding to each vector v=(m, n) for every sample data.

Further, adaptive motion estimation apparatus 200 makes minimum absolute difference sum minD which has been calculated for reference block X in the preceding frame in the same position as reference block X in the current frame an initial target difference value T (X). This is because reference blocks X in the same position in the adjacent frames are similar to each other. Thus, adaptive motion estimation apparatus 200 can set a more or less small initial target difference value T (X), and interrupt the calculations of many PEs in the early stage. Thus, high speed processing and reduction in power consumption can be achieved.

In adaptive motion estimation apparatus 200, after the absolute difference sum for sample data in one column is calculated and added to the original absolute difference sum (S26 in FIG. 9 and S46 in FIG. 10), the absolute difference sum and target difference value T (X) are compared (S27 and S47). The comparison process with respect to target difference value T (X) may be performed for several columns or for several sample data. In addition, absolute difference sum may be calculated for every row or a rectangular region for comparison with respect to target difference value T (X) rather than calculating absolute difference value for every column.

Third Embodiment

An adaptive motion estimation apparatus according to the present embodiment has a structure which is similar to that of adaptive motion estimation apparatus 100 according to the first embodiment. Thus, the description thereof will not be repeated. A part of a method of controlling a controlling portion 113 of an adaptive motion estimation apparatus 100 according to the present embodiment is different.

Figure 12:
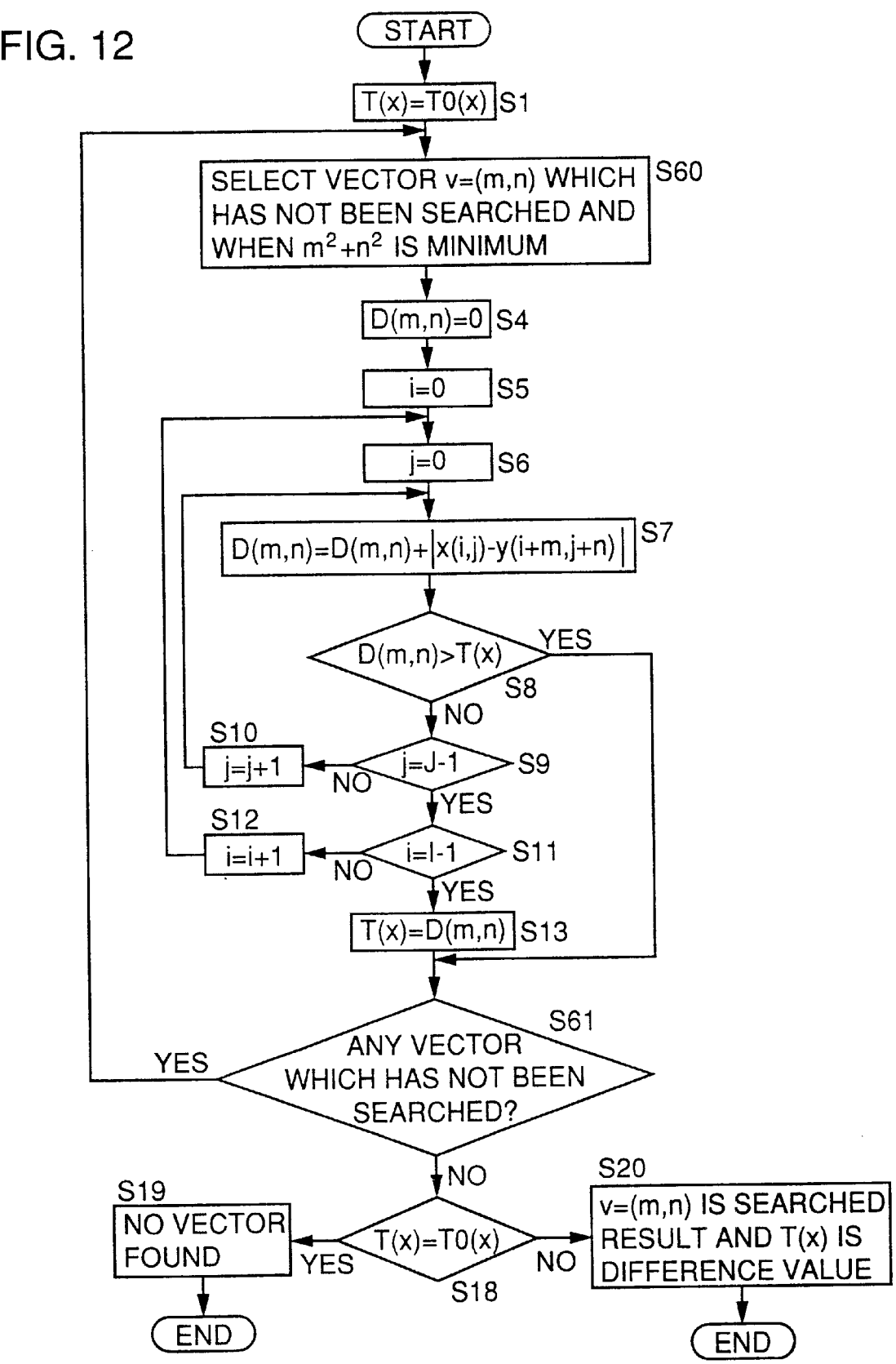
FIG. 12 is a flow chart showing an operation of an adaptive motion estimation apparatus 100 according to a third embodiment of the present invention.

Referring to FIG. 12, each portion of adaptive motion estimation apparatus 100 which has a different method of controlling controlling portion 113 operates as follows.

An intra evaluation value which is an accumulation sum of an absolute value of sample data in a reference block X is set as an initial value T0 (X) of a target different value T (X) (S1). A vector v=(m, n), which has not been searched and when a value of ($m^2+n^2$) is minimum, is selected (S60). Processes similar to those of S4 to S13 in FIG. 5 are performed, and target difference value T (X) is updated as necessary (S4–S13). Determination is made as to whether there is any vector v=(m, n) which has not been searched (S61). If there is a vector which has not been searched (YES in S61), S60 and following steps are repeated. If there is not any vector which has not been searched (NO in S61), processes similar to those in S18 to S20 in FIG. 5 are performed, and a search result is determined (S18–S20).

In adaptive motion estimation apparatus 100 according to the present embodiment, search is performed in the order of vector v=(m, n) having a smaller value of ($m^2+n^2$). This means that the search is performed starting from a vector which is closer to reference block X. Generally, vector v=(m, n) for the minimum absolute difference sum exists in most cases near reference block X. Thus, for the motion picture with less motion, the minimum absolute difference sum is calculated in the early stage. Further, the calculation of the absolute difference sum is interrupted in the initial stage for a vector which is farther than reference block X. Thus, reduction in power consumption can be achieved.

In the present embodiment, search is performed starting from vector v=(m, n) which has a smaller value of ($m^2+n^2$). As a method producing a similar effect, vector v=(m, n) can be searched in a direction helically away from a position of reference block x.

Adaptive motion estimation apparatus 100 according to the present embodiment has a similar effect as that according to the first embodiment.

Fourth Embodiment

In adaptive motion estimation apparatus 200 according to the second embodiment, minimum absolute difference sum minD which has been calculated for reference block X in a preceding frame which is the same position as that of reference block X in the current frame is set as initial value T0 (X) of initial target difference value T (X) by the process in S21 in FIG. 9. In other words, initial value T0 (X) is calculated by using image data in the preceding frame and that in the frame which precedes the preceding frame, with respect to the current frame. When a scene change occurs between the preceding frame and the current frame, however, the possibility that absolute difference value D (m, n) which is smaller than initial value T0 (X) is reduced. Therefore, adaptive motion estimation apparatus 200 must perform the processes from S27 to S31 many times.

Then, in the present embodiment, a large given amount or intra evaluation value is used as initial value T0 (X) when the scene change occurs.

An adaptive motion estimation apparatus according to the present embodiment has a similar structure as that of motion estimation apparatus 200 according to the second embodiment which has been described with reference to FIGS. 6 to 8. Therefore, only the different parts of the structure will be described, and description of all the other parts will not be repeated. An output portion of adaptive motion estimation apparatus 200 according to the present embodiment includes a structure of output portion 230 in the second embodiment provided with a circuit (not shown) for outputting a large given amount or intra evaluation value as initial value T0 (X) of target difference value T (X) when the scene change is detected by an input filter which is not shown in the drawings.

The operation of the adaptive motion estimation apparatus according to the present embodiment is the same as that shown in FIGS. 9 and 10, except for the process in S21. Thus, description of the processes will not be repeated.

As described above, in S21, minimum absolute difference sum minD, which has been calculated for reference block X in the preceding frame in the same position as the reference block in the current frame, generally has initial value T0 (X) of target difference value T (X). When the scene change is detected, however, the large given amount or intra evaluation value is set as initial value T0 (X).

The adaptive motion estimation apparatus according to the present embodiment has a similar effect as that of the second embodiment. In addition, the problem that the processes in S27 to S31 in FIG. 9 are repeated as initial value T0 (X) of target difference value T (x) is too small is alleviated. Accordingly, the time required for processing is reduced and corresponding reduction in power consumption is achieved.

Particularly, when the intra evaluation value is used as initial value T0 (X) of target difference value T (X), a minimum absolute difference sum needs not be ultimately calculated. This is because image compression may be formed for the reference block per se as in the case of the first embodiment. Therefore, in this case, the processes in S27 to S31 can be replaced by those of S47 to S54. Thus, the algorithm for processing can be simplified.

Fifth Embodiment

In adaptive motion estimation apparatus 200 according to the second embodiment, minimum absolute difference sum minD, which has been calculated for reference block X in the preceding frame in the same position as reference block X in the current frame is used as initial value T0 (X) of target difference value T (X). In adaptive motion estimation apparatus 200 according to the present embodiment, the smaller one of minimum absolute difference sum minD which has been calculated for a reference block (X−1) adjacent to reference block X and an intra evaluation value of reference block X is used as initial value T0 (X) of target difference value T (X).

The adaptive motion estimation apparatus according to the present embodiment has a similar structure as that of adaptive motion estimation apparatus 200 according to the second embodiment. Thus, only the different parts will be described, and description of other parts will not be repeated. A threshold value memory 260 of adaptive motion estimation apparatus 200 according to the present embodiment may have a storage capacity smaller than that of threshold value memory 260 according to the second embodiment.

In the second embodiment, minimum absolute difference sum minD which has been calculated by the process in the preceding frame is used as initial value T0 (X) of the target difference value. Generally, there are about one thousand reference blocks in the reference frame. Thus, about one thousand minimum absolute difference sums minD, which number is the same as that of the reference blocks, must be stored in threshold value memory 260. In this embodiment, however, one of minimum absolute difference sum minD which has been calculated for the reference block (X−1) in the same frame adjacent to reference block X and an intra evaluation value of reference block X is used as initial value T0 (X) of target difference value T (X). Thus, only minimum absolute difference sum minD for adjacent reference block (X−1) may be stored in threshold value memory 260.

The operation of adaptive motion estimation apparatus 200 according to the present embodiment is similar to that of adaptive motion estimation apparatus 200 according to the second embodiment which has been described with reference to FIGS. 9 and 10, and therefore the description thereof will not be repeated. It is noted that, as described above, in adaptive motion estimation apparatus 200 according to the present embodiment, the smaller one of absolute difference sum minD for reference block (X−1) and the intra evaluation value is set as initial value T0 (X) of target difference value T (X) by the process in S21 in FIG. 9.

Generally, one reference block X has in most cases a property which is similar to that of adjacent reference block (X−1). Thus, by using minimum absolute difference sum minD for reference block (X−1) as initial value T0 (X) of target difference value T (X), the processes from S27 to S31 in FIG. 9 can be efficiently performed.

In addition, adaptive motion estimation apparatus 200 according to the present embodiment has an effect which is similar to that of adaptive motion estimation apparatus 200 according to the second embodiment.

Sixth Embodiment

Referring to FIG. 6, adaptive motion estimation apparatus 200 according to the second embodiment is provided with threshold value memory 260 in output portion 230. Thus, target difference value T (X) is applied to each of PEs 201 to 204 from output portion 230.

Adaptive motion estimation apparatus 200 according to the present embodiment is provided with a threshold value memory for each of PEs 201 to 204, so that target difference value T (X) is stored in each threshold value memory.

Figure 13:
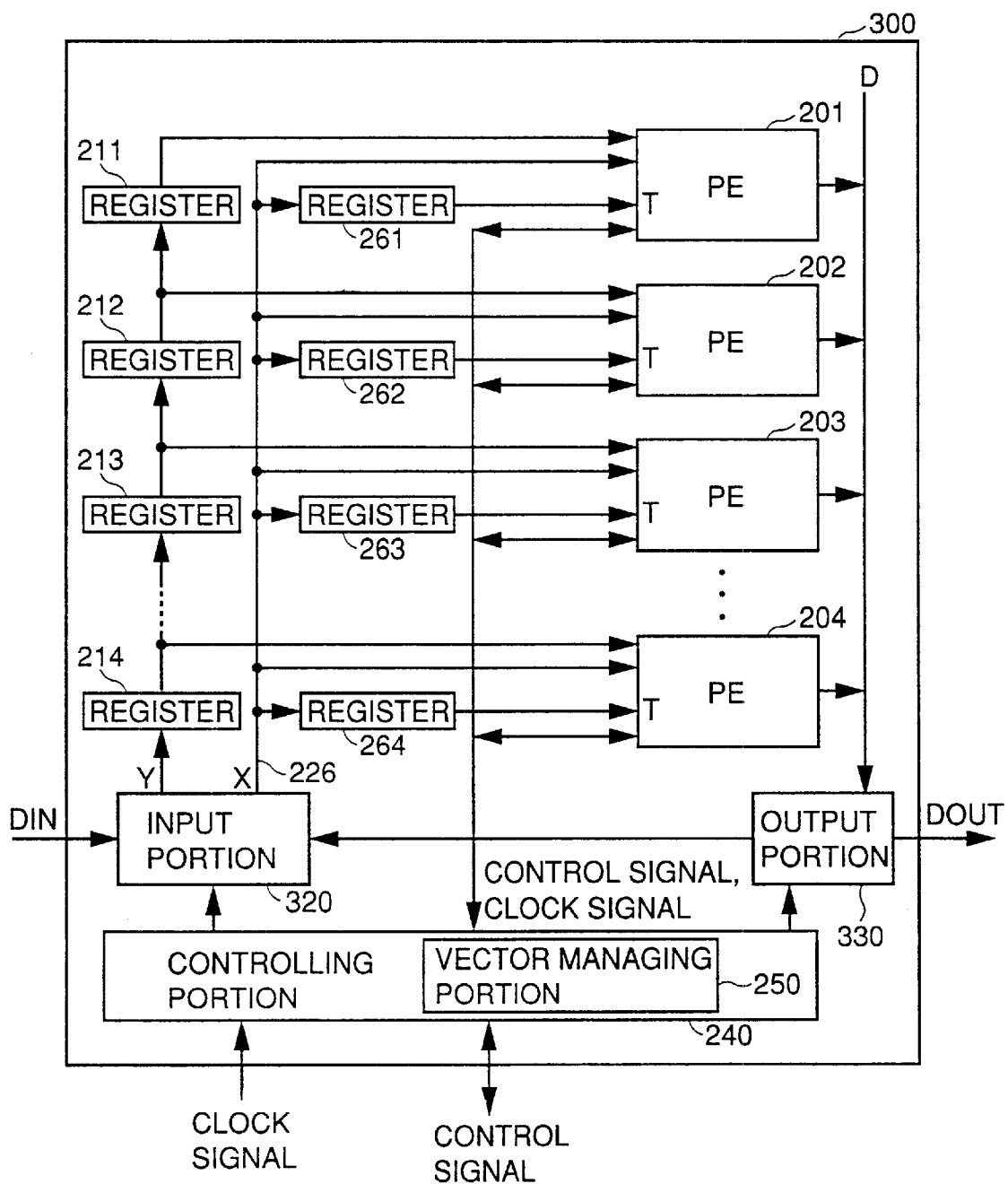
FIG. 13 is a diagram showing a structure of an adaptive motion estimation apparatus 300 according to a sixth embodiment of the present invention.

Referring to FIG. 13, an adaptive motion estimation apparatus 300 according to the present embodiment includes: an input portion 320 sequentially receiving a moving picture frame, sequentially outputting sample data x for reference block X and sample data y for one of blocks to be searched Y (m, n), and receiving and outputting a target difference value T (X) from an output portion 330 which will be later described; registers 211 to 214; PEs 201 to 204; output portion 330 receiving an absolute difference sum output from PEs 201 to 204 and outputting a minimum value of the absolute difference sum at a suitable timing for outputting target difference value T (X); and threshold value memories 261 to 264 holding target difference values T (X) output from input portion 320 for applying them to PEs 201 to 204, respectively.

The operation of adaptive motion estimation apparatus 300 is similar to that of adaptive motion estimation apparatus 200 according to the second embodiment which has been described with reference to FIGS. 9 and 10. Thus, description thereof will not be repeated.

In adaptive motion estimation apparatus 300, threshold value memories 261 to 264 are respectively arranged near inputs of PEs 201 to 204. target difference value T (X) is set to threshold value memories 261 to 264 through a bus 226 which is used for applying reference block X to each of PEs 201 to 204 from input portion 320. Thus, need for a bus 229 (FIG. 6) is eliminated which is necessary for adaptive motion estimation apparatus 200 for applying target difference value T (X) to each of PEs 201 to 204 from output portion 230. Therefore, adaptive motion estimation apparatus 300 is provided with a simple bus structure as compared with adaptive motion estimation apparatus 200. In addition, it has an effect which is similar to that of adaptive motion estimation apparatus 200.

Seventh Embodiment

Figure 14:
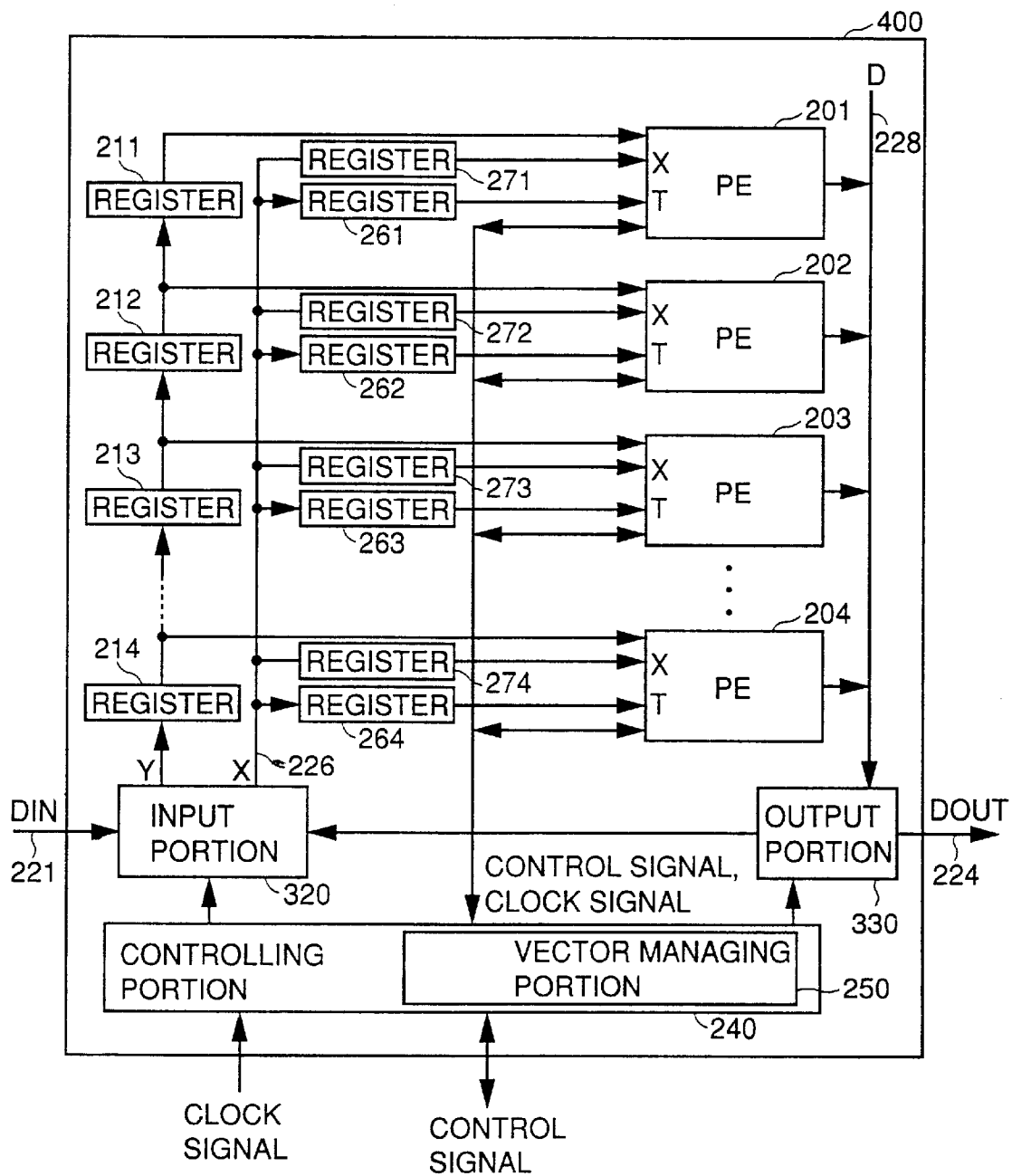
FIG. 14 is a diagram showing a structure of an adaptive motion estimation apparatus 400 according to a seventh embodiment of the present invention.

Referring to FIG. 14, an adaptive motion estimation apparatus 400 according to the present embodiment further includes registers 271 to 274 respectively connected to inputs of PEs 201 to 204 for storing sample data x of reference block X in addition to the structure of adaptive motion estimation apparatus 300 according to the sixth embodiment which has been described with reference to FIG. 13. Each of registers 271 to 274 has J latches and can store sample data corresponding to one column of reference block X.

PEs 201 to 204, and threshold value memories 261 to 264, registers 271 to 274 and 211 to 214 which are connected to PEs are divided into groups of I. Thus, all of (I×J) sample data of reference block X are stored in registers 271 to 274 in one group.

If there are K groups, adaptive motion estimation apparatus 400 can simultaneously perform processes for K reference blocks. K reference blocks are selected such that search ranges 163 (FIG. 2) have a common portion. Each of K reference blocks can have the largest area of the common portion of the search ranges if it is arranged adjacent to one of other reference blocks.

A value of one of blocks to be searched Y (m, n) included in the common search range can be used in all of PEs 201 to 204. Thus, by sequentially setting the value of one of blocks to be searched Y (m, n) in the common search range to registers 211 to 214, processes for a plurality of reference blocks can simultaneously be performed.

The operation of adaptive motion estimation apparatus 400 is similar to that of adaptive motion estimation apparatus 200 according to the second embodiment which has been described with reference to FIGS. 9 and 10. It is noted that although the plurality of processes are performed for one reference block X in parallel in adaptive motion estimation apparatus 200, a plurality of processes for K reference blocks are performed in parallel in adaptive motion estimation apparatus 400.

With use of adaptive motion estimation apparatus 400, absolute difference sum calculations for blocks to be searched with respect to a plurality of reference blocks can be performed in parallel. Thus, the speed of processing can be increased and reduction in power consumption of the apparatus can be achieved.

In addition, adaptive motion estimation apparatus 400 has an effect which is similar to that of adaptive motion estimation apparatus 300 according to the sixth embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion estimation method, comprising the steps of:

sequentially selecting one of blocks to be searched in a search range;

sequentially calculating differences between corresponding sample values of a first reference block and said one of blocks to be searched for accumulating absolute values of differences;

comparing an intermediate result of the accumulated value and a prescribed threshold value for a prescribed number of samples and interrupting said step of accumulating said absolute values of differences when said intermediate result exceeds said prescribed threshold value; and making said one of blocks to be searched having a minimum final result of said accumulated value correspond to said reference block, wherein the prescribed threshold value is dependent on one of the following values, 1) an intra evaluation value of said first reference block, which is a sum obtained by accumulating absolute values of sample data in said first reference block, 2) an absolute difference sum calculated for a second reference block in a preceding frame at the same position as the first reference block in a current frame, and 3) an absolute difference sum calculated for a second reference block different from said first reference block in a same frame.

2. The motion estimation method according to claim 1, wherein said step of sequentially selecting said one of blocks to be searched in said search range includes the step of selecting said one of blocks to be searched in an order of a position closer to said first reference block.

3. The motion estimation method according to claim 1, wherein said step of accumulating said absolute values of difference includes a plurality of steps of each sequentially calculating differences between corresponding sample values of said first reference block and said one of blocks to be searched and accumulating said absolute values of differences for each of said plurality of blocks to be searched, and said step of interrupting said step of accumulating said absolute values of differences includes:

the step of comparing the intermediate result of the accumulated value and said prescribed threshold value for said prescribed number of samples and interrupting said accumulation process when said intermediate result exceeds said prescribed threshold value for each of said plurality of steps of accumulating said absolute values of differences; and the step of increasing said prescribed threshold value by a given amount and again performing said plurality of steps of accumulating said absolute values of differences in parallel when all of said plurality of steps of accumulating said absolute values of differences are interrupted as said intermediate result of said accumulated value exceeds said prescribed threshold value.

4. A motion estimation apparatus, comprising:

means for selecting one of blocks to be searched for sequentially selecting one of blocks to be searched in a search range;

absolute difference accumulating means for sequentially calculating differences between corresponding sample values of a first reference block and said one of blocks to be searched and accumulating absolute values of differences;

accumulation operation interrupting means connected to an output of said absolute difference accumulating means for comparing an intermediate result of the accumulated value and a prescribed threshold value every time when differences between corresponding sample values of said first reference block and said one of blocks to be searched are calculated prescribed times and for interrupting the operation of said absolute difference accumulating means when said intermediate result exceeds said prescribed threshold value; and correspondence means for making said one of blocks to be searched having a minimum final result of said accumulated value correspond to said reference block, wherein the prescribed threshold value is dependent on one of the following values, 1) an intra evaluation value of said first reference block, which is a sum obtained by accumulating absolute values of sample data in said first reference block, 2) an absolute difference sum calculated for a second reference block in a preceding frame at the same position as the first reference block in a current frame, and 3) an absolute difference sum calculated for a second reference block different from said first reference block in a same frame.

5. The motion estimation apparatus according to claim 4, wherein said absolute difference accumulating means includes:

a subtracter receiving two samples in positions in which said first reference block and said one of blocks to be searched correspond to each other;

an absolute value computing element connected to said subtracter for receiving an output from said subtracter;

an accumulation register for storing an accumulated value of outputs from said absolute value computing element; and an adder connected to said accumulation register and said absolute value computing element for receiving the output from said absolute value computing element and a value held in said accumulation register and writing an addition result to said accumulation register.

6. The motion estimation apparatus according to claim 4, further comprising means for comparing a final result of said accumulated value and said prescribed threshold value and updating said prescribed threshold value by said final result if said final result exceeds said prescribed threshold value.

7. The motion estimation apparatus according to claim 6, wherein said one of blocks to be searched selecting means includes means for selecting said one of blocks to be searched in an order of a position closer to said first reference block.

8. The motion estimation apparatus according to claim 4, wherein said one of blocks to be searched selecting means includes means for selecting said one of blocks to be searched in an order of a position closer to said first reference block.

9. A motion estimation apparatus, comprising:

means for selecting one of blocks to be searched for sequentially selecting one of blocks to be searched in a search range;

a plurality of registers each holding a sample value of said one of blocks to be searched and receiving a value of an adjacent register;

a plurality of processing means connected to each of said plurality of registers for sequentially calculating differences between corresponding sample values of a reference block and said one of blocks to be searched, accumulating absolute values of differences, comparing an accumulated value and a prescribed threshold value dependent on said reference block and interrupting an operation when said accumulated value exceeds said prescribed threshold value;

means connected to said plurality of processing means for storing a calculation result of said processing means when said calculation result of said processing means is smaller than said prescribed threshold value; and threshold value managing means for applying said prescribed threshold value to each of said plurality of processing means, increasing said prescribed threshold value by a given amount and again applying said prescribed threshold value to said plurality of processing means when all of said plurality of processing means are interrupted as all accumulated values exceed said prescribed threshold value.

10. The motion estimation apparatus according to claim 9, wherein each of said plurality of processing means includes:

a first gate receiving a sample of said reference block;

a second gate receiving a sample of said one of blocks to be searched;

an absolute difference sum computing element connected to said first and second gates for receiving outputs from said first and second gates;

an adder receiving an output from the output of said absolute difference sum computing element;

an accumulation register connected to an output of said adder for holding said accumulated value;

a comparison computing element receiving a value of said accumulation register and said prescribed threshold value for outputting a comparison result of said value of accumulation register and said prescribed threshold value; and means connected to an output of said comparison computing element for applying to said first and second gates signals in accordance with said comparison result of said value of accumulation register and said prescribed threshold value.

11. The motion estimation apparatus according to claim 9, wherein said prescribed threshold value is the minimum value of final accumulated values calculated for a reference block in a preceding frame in the same position as said reference block.

12. The motion estimation apparatus according to claim 9, wherein said prescribed threshold value is the minimum value of final accumulated values calculated for a reference block adjacent to said reference block in the same frame.

13. The motion estimation apparatus according to claim 9, further comprising means for detecting an occurrence of a scene change, and wherein said prescribed threshold value is one of a value dependent on said reference block in the current frame and a value dependent on a reference block in a preceding frame.

14. The motion estimation apparatus according to claim 9, further comprising a plurality of reference value registers connected to said plurality of processing means for holding sample data of a plurality of reference blocks.

15. The motion estimation apparatus according to claim 9, further comprising a bus for supplying a sample value of said reference block for said plurality of processing means; and a plurality of threshold value registers connected to said bus and said plurality of processing means for holding said threshold value, and wherein said threshold value is transferred in a first period and said sample value of said reference block is transferred in a second period by said bus.

16. The motion estimation apparatus according to claim 9, wherein said threshold value managing means includes:

a Manchester type carry propagation circuit receiving a comparison result output from said plurality of processing means; and means for applying said prescribed threshold value to each of said plurality of processing means, increasing said prescribed threshold value by a given amount in accordance with an output from said Manchester type carry propagation circuit and again applying said prescribed threshold value to said plurality of processing means.

\* \* \* \* \*